United States Patent
Fukumoto

Patent Number: 5,812,324
Date of Patent: Sep. 22, 1998

[54] EYEPIECE WITH LARGE EYE RELIEF

[75] Inventor: Satoshi Fukumoto, Tokyo, Japan

[73] Assignee: Nikon Corporation, Tokyo, Japan

[21] Appl. No.: 660,934

[22] Filed: Jun. 10, 1996

[30] Foreign Application Priority Data

Jun. 22, 1995 [JP] Japan .................................... 7-179368

[51] Int. Cl.[6] ................................................ G02B 25/00
[52] U.S. Cl. ................................ 359/643; 359/646
[58] Field of Search ................................ 359/643, 644, 359/645, 646, 783

[56] References Cited

U.S. PATENT DOCUMENTS

| | | | |
|---|---|---|---|
| 3,233,513 | 2/1966 | Wagner et al. | 359/643 |
| 3,352,620 | 11/1967 | Scidmore et al. | 359/644 |
| 3,384,434 | 5/1968 | Scidmore et al. | 359/644 |
| 3,638,996 | 2/1972 | Klein | 359/643 |
| 4,286,844 | 9/1981 | Nagler | 359/644 |
| 5,579,167 | 11/1996 | Oomura et al. | 359/643 |
| 5,612,823 | 3/1997 | Koizumi | 359/644 |
| 5,619,379 | 4/1997 | Fukumoto | 359/644 |
| 5,638,213 | 6/1997 | Ueno | 359/643 |

FOREIGN PATENT DOCUMENTS 61-228411(A) 10/1986 Japan .
6-175047 6/1994 Japan .
7-225344 8/1995 Japan .

OTHER PUBLICATIONS

Ser. No. 08/285,518, Aug. 4, 1994, Oomura et al.

*Primary Examiner*—Frank G. Font
*Assistant Examiner*—Michael P. Stafira
*Attorney, Agent, or Firm*—Klarquist Sparkman Campbell Leigh & Whinston, LLP

[57] ABSTRACT

A compact eyepiece is disclosed for use with an objective lens in a microscope, binocular, telescope, etc., that favorably corrects optical aberrations over a sufficiently wide apparent field of view and that offers an eye relief that is larger than the focal length of the eyepiece. The eyepiece comprises, in order from the objective side, a negative first lens group G1 and a positive second lens group G2. The second lens group has an objective-side focal plane situated between the first lens group G1 and the second lens group G2. The second lens group G2 comprises, in order from the objective side, a first lens subgroup G21 having positive refractive power and comprising a positive lens element G21A and a positive cemented lens G21B, and a second lens subgroup G22 having positive refractive power and comprising a positive lens element. The eyepiece satisfies certain quantitative conditions.

23 Claims, 3 Drawing Sheets

EYEPIECE WITH LARGE EYE RELIEF

FIELD OF THE INVENTION

This invention pertains to eyepiece lenses (eyepieces), especially to eyepieces for use in telescopes, binoculars, or microscopes.

BACKGROUND OF THE INVENTION

Optical instruments such as telescopes, binoculars, and microscopes customarily have at least one eyepiece paired with an objective lens displaced objectwise relative to the eyepiece. The eyepiece serves to further enlarge an image produced by the objective lens and to allow observation of the enlarged image by a user.

Contemporary standards require that eyepieces exhibit favorable correction of various optical aberrations, preferably across a wide angle of view, and that, for comfortable use, a sufficient amount of eye relief (the axial distance between the lens face closest to the eye side of the eyepiece and the eye point) be provided.

In conventional eyepieces in general, the maximal eye relief is about 80 percent of the focal length of the eyepiece. Thus, it has not been possible to obtain sufficient eye relief with an eyepiece having a short focal length. Moreover, attempts to increase the eye relief while not changing the apparent field of view usually have generally required that the aperture of the eyepiece on the eye side be enlarged. As is well known, such enlargement of the eye-side aperture generally causes an unacceptable increase in certain aberrations at the periphery of the field of view, especially astigmatism and distortion.

Japan Kokai Patent Publication No. SHO 56-85723 discloses an eyepiece consisting of a negative lens group on the objective side and a positive lens group on the eye side, with a field stop between the two groups. The negative lens group helps achieve a suitably long eye relief and, if the negative lens group has a strong refractive power, the Petzval's sum of the eyepiece can be favorably decreased which minimizes curvature of field. With such an eyepiece, the closer the ratio of the focal length of the negative lens group to the focal length of the positive lens group is to unity (i.e., 1:1), the more readily possible it is to favorably reduce Petzval's sum. Unfortunately, however, in cases where this ratio of focal lengths is substantially at unity, the total length of the eyepiece becomes inconveniently long whenever the focal length of the negative lens group is increased. Conversely, whenever the focal length of the negative lens group is shortened, the focal length of the positive lens group is also shortened, which is disadvantageous with respect to correcting aberrations and maintaining satisfactory eye relief.

SUMMARY OF THE INVENTION

The present invention solves the aforementioned problems, by providing, inter alia, a compact eyepiece in which all optical aberrations are favorably corrected across a wide apparent field of view (about 50 degrees or more), and that provides an eye relief that is greater than the focal length of the eyepiece.

According to a preferred embodiment, an eyepiece according to the present invention comprises, in order from the objective side: a first lens group G1 having a negative refractive power, and a second lens group G2 having a positive refractive power. The eyepiece has a focal surface (image surface) situated within an axial spacing D that extends between the first and second lens groups. (The focal surface is formed by the first lens group G1 and an objective lens with which the eyepiece is used.) The second lens group G2 comprises, in order from the objective side, a first lens subgroup G21 and a second lens subgroup G22. The first lens subgroup G21 has positive refractive power and comprises a positive lens element and a positive cemented lens. The second lens subgroup G22 has positive refractive power and comprises at least one positive lens element.

According to another aspect of the present invention, the eyepiece preferably satisfies the following conditions:

$-3.6 \leq f1/f \leq -1.2;$ $0.4 \leq D/f \leq 1.8;$ and $-3.4 \leq f1/f2 \leq -1.1.$ wherein f is the focal length of the eyepiece, f1 is the focal length of the first lens group G1, f2 is the focal length of the second lens group, and D is the axial distance between the first lens group G1 and the second lens group G2.

Other advantages and features of the present invention can be ascertained from the following detailed description, drawings, and claims.

DETAILED DESCRIPTION

Figure 1:
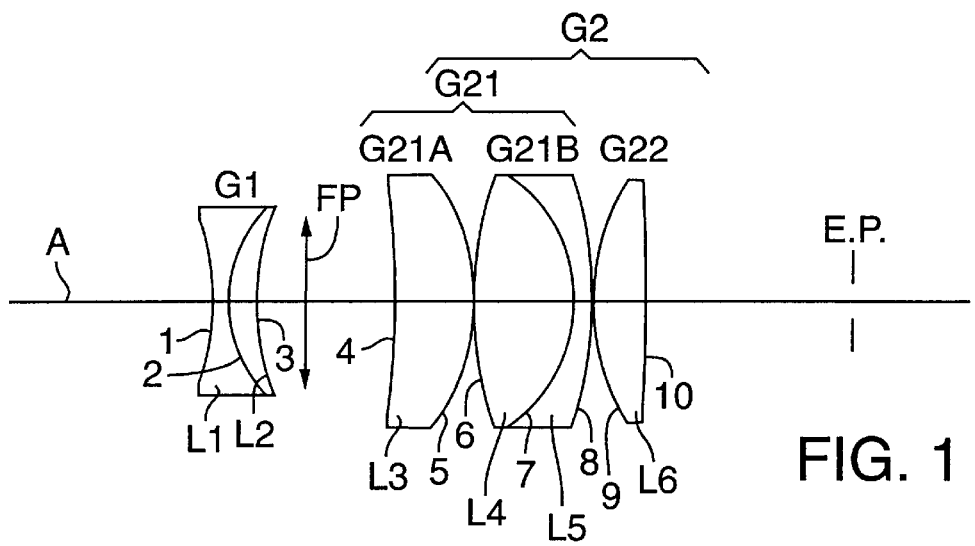
FIG. 1 is a schematic optical diagram depicting general aspects of an eyepiece according to the present invention as well as specific aspects of the first example embodiment (note: E.P. denotes the eyepoint of the respective eyepiece).

General aspects of an eyepiece lens (i.e., an eyepiece) according to the present invention are shown in FIG. 1, depicting, in order from the objective (left) side, a first lens group G1 having a negative refractive power and a second lens group G2 having a positive refractive power. Both lens groups G1, G2 are situated on an optical axis A relative to an eye point (E.P.) situated on the eye (right) side of the eyepiece. A focal plane FP is situated on the objective side of the second lens group G2 between the first lens group G1 and the second lens group G2. The second lens group G2 comprises a first lens subgroup G21 having a positive refractive power and including, in order from the object side, a positive lens element G21A and a positive cemented lens G21B. The second lens group G2 also comprises a second lens subgroup G22 that includes at least one positive lens element.

According to a preferred embodiment of this invention, the second lens subgroup G22 comprises at least one positive lens element having a convex surface oriented toward the objective side. For example, the second lens subgroup G22 can consist of two positive lens elements each having a convex surface oriented toward the objective side. In addition, the cemented lens G21B preferably comprises, in order from the side, a bi-convex lens element cemented to a negative meniscus lens element.

The relationship of each lens group in an eyepiece according to the present invention is as follows. First, if the axial distance D is increased with the focal length f1 of the first lens group G1 being kept constant, then the focal length f2 of the second lens group G2 becomes larger. This is advantageous for eye relief and reduction of Petzval's sum. However, this causes an increase in the length of the eyepiece and can cause a disadvantageously large increased diameter of the second lens group G2. On the other hand, if the axial distance D is increased while keeping the focal length f2 of the second lens group G2 constant, the focal length f1 of the first lens group G1 increases. This can cause an undesirable increase in the Petzval's sum with a correspondingly increased difficulty in correcting curvature of field.

To avoid the foregoing undesirable consequences, an eyepiece according to the present invention satisfies the following conditions:

$$-3.6 \leq f1/f \leq -1.2 \quad (1)$$

$$0.4 \leq D/f \leq 1.8 \quad (2)$$

$$-3.4 \leq f1/f2 \leq -1.1 \quad (3)$$

wherein f is the focal length of the eyepiece, f1 is the focal length of the first lens group G1, f2 is the focal length of the second lens group G2, and D is the axial spacing between the first lens group G1 and the second lens group G2.

Condition (1) stipulates a preferred range for the ratio of the focal length f1 of the first lens group G1 to the focal length f. In condition (1), if f1/f were to fall below the lower limit of condition (1), then the Petzval's sum of the eyepiece would undesirably increase to a level at which it would be prohibitively difficult to adequately correct curvature of field and astigmatism. If f1/f were to exceed the upper limit of condition (1), then the divergent action of the first lens group G1 would be so strong as to cause a disadvantageous increase in the diameter of the eyepiece.

Better results can be obtained if the lower limit of condition (1) is −3.5 and the upper limit is −1.4; even more advantageous results can be obtained if the lower limit of condition (1) is −3.3 and the upper limit is −1.5.

Condition (2) stipulates a preferred range for the axial distance D, between the first lens group G1 and the second lens group G2, relative to f. If D/f were to fall below the lower limit of condition (2), then the axial distance D would be so small as to allow each lens group G1, G2 to be situated too close to the focal plane FP; this would allow flaws and debris on lens surfaces to be undesirably visible, along with the observed image, to a user looking through the eyepiece. If D/f were to exceed the upper limit of condition (2), then the overall length of the eyepiece would excessively increase, thereby reducing highly desirable compactness.

Better results can be obtained if the lower limit of condition (2) is 0.6 and the upper limit is 1.5.; even more advantageous results can be obtained if the lower limit of condition (2) is 0.7 and the upper limit is 1.1.

Condition (3) stipulates a preferred range for the ratio of the focal length f1 of the first lens group G1 to the focal length f2 of the second lens group G2. If f1/f2 were to fall below the lower limit of condition (3), then the Petzval's sum of the eyepiece would be prohibitively high to allow adequate correction of curvature of field and other aberrations. If f1/f2 were to exceed the upper limit of condition (3), then the focal length f1 of the first lens group G1 would be so short that the refractive-power burden borne by the first lens group G1 relative to the second lens group G2 would be disadvantageously large. This would cause the first lens group G1 to disproportionately generate aberrations that would be prohibitively difficult for the second lens group G2 to correct. Here, if in the eyepiece there is an arrangement of refractive power such that each of the focal lengths f1 and f2 has a sufficiently large value, then the refractive-power burden on the first lens group G1 can be considered small. Nevertheless, in such an instance, the axial distance D would be too great to maintain a highly desirable compactness of the eyepiece.

Better results can be obtained if the lower limit of condition (3) is −3.2 and the upper limit is −1.3; even more advantageous results can be obtained if the lower limit of condition (3) is −3 and the upper limit is −1.5.

By situating the negative lens group G1 on the objective side of a field stop (at the focal plane FP), eye relief is favorably extended and curvature of field is adequately corrected. Also, the lens element G21A provides appropriate convergence to rays to keep the diameters of the lens elements on the eye side of the lens element G21A from getting larger than the diameter of the lens element G21A. Furthermore, the positive cemented lens G21B together with the positive lens element G21A contribute to correction of distortion, coma aberration, and chromatic aberration more than the single lens element G21A.

By configuring the first lens group G1 as a compound lens having, in order from the objective side, a negative lens element cemented to a positive lens element, the position of the principal point of the first lens group G1 can be disposed closer to the image plane FP. Moreover, in the second lens group G2, by configuring the lens G21B as a compound lens having, in order from the objective side, a positive lens element cemented to a negative lens element, the position of the principal point of the second lens group G2 can be disposed closer to the image plane FP while also bringing the position of the principal point of this cemented lens G21B closer to the image plane. By keeping the intervals between the image plane FP and the principal points of the lens groups G1 and G2 substantially the same, the actual corresponding spatial distances can be kept sufficiently large to prevent flaws and debris on lens surfaces from being visible to the user looking through the eyepiece.

EXAMPLE EMBODIMENTS

Example embodiments of this invention are explained below and optically depicted in the corresponding FIGS. 1, 3, and 5.

The eyepiece of each example embodiment comprises, in order from the objective side, a first lens group G1 having a negative refractive power and a second lens group G2 having a positive refractive power. The objective-side focal plane FP of the second lens group G2 is situated between the first lens group G1 and the second lens group G2. The second lens group G2 comprises, in order from the objective side, a first lens subgroup G21 having a positive refractive power and comprising a positive lens element G21A and a positive cemented lens G21B, and a second lens subgroup G22 having a positive refractive power and comprising at least one positive lens element.

Example Embodiment 1

The eyepiece of example embodiment 1 is depicted in FIG. 1. The eyepiece includes, in order from the objective side, a first lens group G1 and a second lens group G2. The first lens group G1 includes a negative compound lens constructed of a bi-concave lens element L1 cemented to a positive meniscus lens element L2 having a convex surface 2 oriented toward the objective side. The first lens subgroup G21 includes a positive meniscus lens element L3 (G21A) having a concave surface 4 oriented toward the objective side, and a positive compound lens G21B constructed of a bi-convex lens element L4 cemented to a negative meniscus element L5 having a concave surface 7 oriented toward the objective side. The second lens subgroup G22 includes a bi-convex lens element L6. The eye point of the eyepiece is designated as E.P.

Numerical data pertaining to this example embodiment are listed in Table 1, below. In Table 1, r denotes the radius of curvature of, and d denotes axial distances between, lens surfaces. Also, n denotes refractive index, and ν denotes the Abbe number, both relative to d-line light (λ=587.6 nm).

TABLE 1

Eyepiece focal length: f = 15.0 mm
Apparent field of view: 2ω = 56°
Eye relief: 19.0 mm

| Surf. | r | d | n | ν |
|---|---|---|---|---|
| 1 | −35.0 | 1.4 | 1.517 | 64.1 |
| 2 | 16.3 | 2.5 | 1.805 | 25.5 |
| 3 | 25.6 | 12.6 | | |
| 4 | −88.1 | 7.5 | 1.620 | 60.1 |
| 5 | −24.1 | 0.2 | | |
| 6 | 48.8 | 9.4 | 1.620 | 60.1 |
| 7 | −17.1 | 1.5 | 1.805 | 25.5 |
| 8 | −47.8 | 0.2 | | |
| 9 | 26.9 | 4.8 | 1.620 | 60.1 |
| 10 | −174.3 | | | |

Values of conditions:

f1 = −35.0 mm
f2 = 17.1 mm
D = 12.6 mm
(1) f1/f = −2.33
(2) D/f = 0.84
(3) f1/f2 = −2.05

Figure 2A:
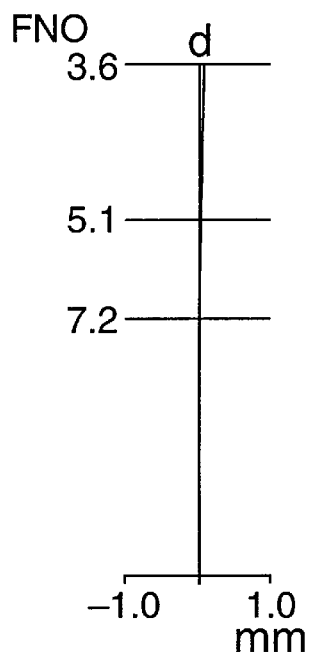
FIGS. 2A–2C are plots of spherical aberration, astigmatism, and distortion, respectively, for an eyepiece according to the first example embodiment.
Figure 2B:
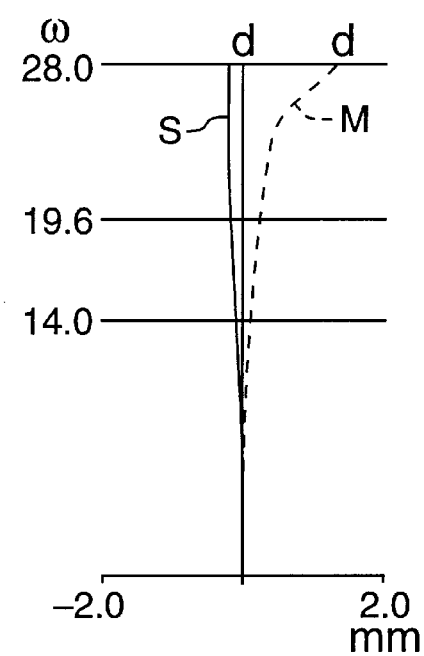
Figure 2C:
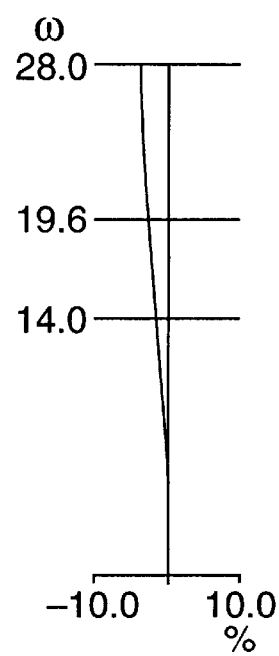

FIGS. 2A–2C are aberration plots for example embodiment 1, wherein FIG. 2A is of spherical aberration, FIG. 2B is of astigmatism, and FIG. 2C is of distortion. In each plot, the tracings pertain to light on the eye side. In FIG. 2A, FNO denotes the F number of the eyepiece, ω indicates the apparent field of view, and d indicates the d line (λ=587.6 nm). In FIG. 2B, S denotes the sagittal image surface and M denotes the meridional image surface.

As is clear from FIGS. 2A–2C, the various aberrations are favorably corrected in this example embodiment while maintaining a wide apparent field of view (apparent field of view of 56°), and while maintaining an eye relief that is 127 percent of the focal length of the eyepiece.

Example Embodiment 2

Figure 3:
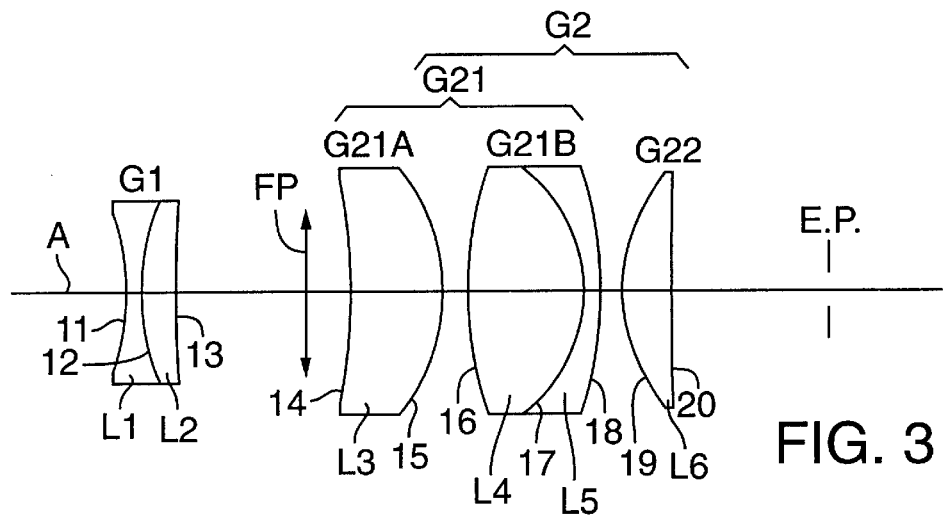
FIG. 3 is a schematic optical diagram depicting specific aspects of an eyepiece according to the second example embodiment.

The eyepiece of example embodiment 2 is depicted in FIG. 3. The eyepiece includes, in order from the objective side, a first lens group G1 and a second lens group G2. The first lens group G1 includes a negative compound lens constructed of a bi-concave lens element L1 cemented to a positive meniscus lens element L2 having a convex surface 12 oriented toward the objective side. The first lens subgroup G21 includes a positive meniscus lens element L3 (G21A) having a concave surface 14 oriented toward the objective side, and a positive compound lens G21B constructed of a bi-convex lens element L4 cemented to a negative meniscus lens element L5 having a concave surface 17 oriented toward the objective side. The second lens subgroup G22 includes a planoconvex lens element L6 having a convex surface oriented toward the objective side. The eye point of the eyepiece is designated as E.P.

Numerical data pertaining to this example embodiment are listed in Table 2, below. In Table 2, r denotes the radius of curvature of, and d denotes axial distances between, lens surfaces. Also, n denotes refractive index, and ν denotes the Abbe number, both relative to d-line light (λ=587.6 nm).

TABLE 2

Eyepiece focal length: f = 13.8 mm
Apparent field of view: 2ω = 60°
Eye relief: 14.4 mm

| Surf | r | d | n | ν |
|---|---|---|---|---|
| 11 | −31.8 | 1.5 | 1.60 | 60.6 |
| 12 | 31.8 | 3.0 | 1.76 | 26.5 |
| 13 | 116.9 | 17.0 | | |
| 14 | −48.2 | 9.0 | 1.62 | 60.1 |
| 15 | −21.8 | 2.2 | | |
| 16 | 54.4 | 11.0 | 1.62 | 60.1 |
| 17 | −18.0 | 1.5 | 1.76 | 26.5 |
| 18 | −49.2 | 2.2 | | |
| 19 | 20.5 | 5.0 | 1.56 | 60.7 |
| 20 | ∞ | | | |

Values of conditions:

f1 = −48.4
f2 = 18.0
D = 17.0
(1) f1/f = −3.51
(2) D/f = 1.23
(3) f1/f2 = −2.69

Figure 4A:
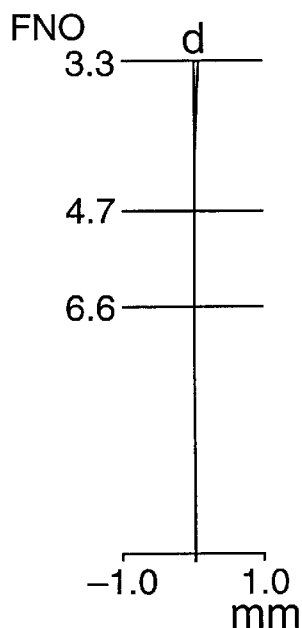
FIGS. 4A–4C are plots of spherical aberration, astigmatism, and distortion, respectively, for an eyepiece according to the second example embodiment.
Figure 4B:
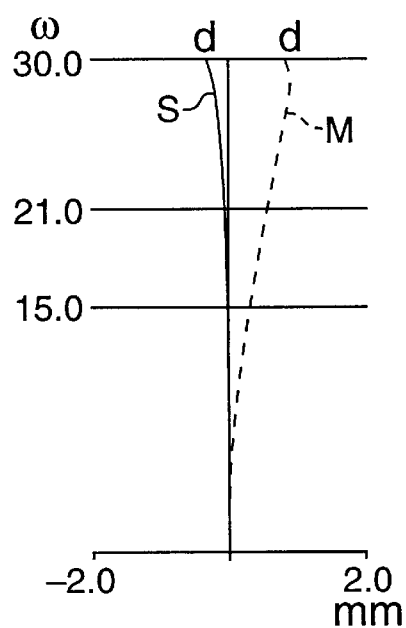
Figure 4C:
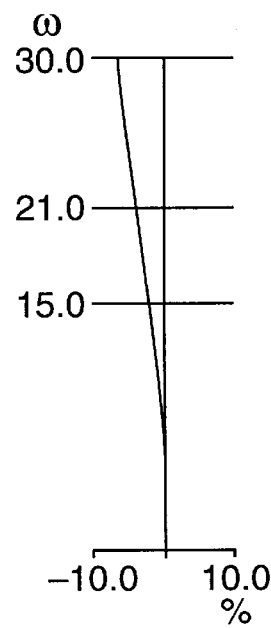

FIGS. 4A–4C are aberration plots for example embodiment 2, wherein FIG. 4A is of spherical aberration, FIG. 4B is of astigmatism, and FIG. 4C is of distortion. In each plot, the tracings pertain to light on the eye side. In FIG. 4A, FNO denotes the F number of the eyepiece, ω indicates the apparent field of view, and d indicates the d line (λ=587.6 nm). In FIG. 4B, S denotes the sagittal image surface and M denotes the meridional image surface.

As is clear from FIGS. 4A–4C, the various aberrations are favorably corrected in this example embodiment while maintaining a wide apparent field of view (apparent field of view of 60°), and while maintaining an eye relief that is 104 percent of the focal length of the eyepiece.

Example Embodiment 3

Figure 5:
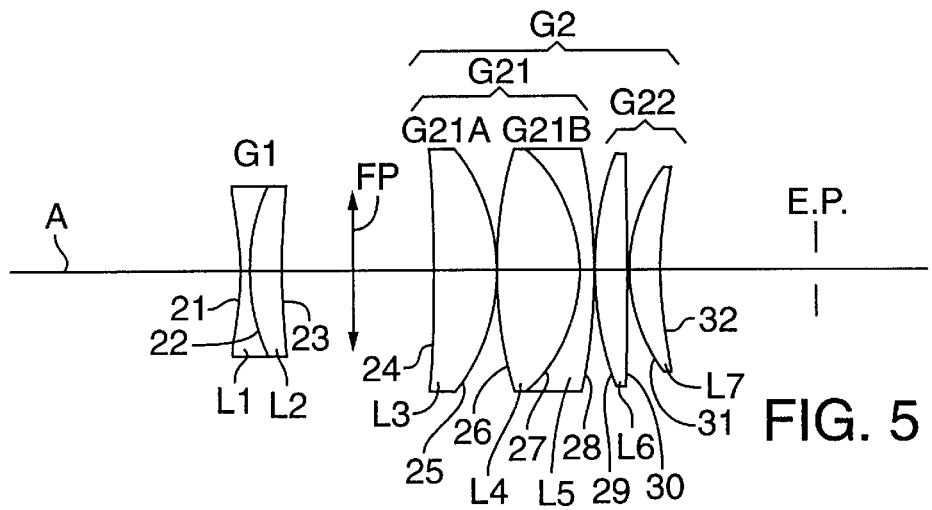
FIG. 5 is a schematic optical diagram depicting specific aspects of an eyepiece according to the third example embodiment.

The eyepiece of example embodiment 3 is depicted in FIG. 5. The eyepiece includes, in order from the objective side, a first lens group G1 and a second lens group G2. The first lens group G1 includes a negative compound lens constructed of a bi-concave lens element L1 cemented to a positive meniscus lens element L2 having a convex surface 22 oriented toward the objective side. The first lens subgroup G21 includes a positive meniscus lens element L3 (G21A) having a concave surface 24 oriented toward the objective side, and a positive compound lens G21B constructed of a bi-convex lens element L4 cemented to a negative meniscus lens element L5 having a concave surface 27 oriented toward the objective side. The second lens subgroup G22 includes a bi-convex lens element L6 and a positive meniscus lens element L7 having a convex surface 31 oriented toward the objective side. The eye point of the eyepiece is designated as E.P.

Numerical data pertaining to this example embodiment are listed in Table 3, below. In Table 3, r denotes the radius of curvature of, and d denotes axial distances between, lens surfaces. Also, n denotes refractive index, and ν denotes the Abbe number, both relative to d-line light (λ=587.6 nm).

TABLE 3

Eyepiece focal length: f = 13.8 mm
Apparent field of view: 2ω = 60°
Eye relief: 14.8 mm

| Surf. | r | d | n | ν |
|---|---|---|---|---|
| 1 | −40.7 | 1.0 | 1.66 | 57.3 |
| 2 | 25.4 | 3.0 | 1.81 | 25.3 |
| 3 | 76.9 | 15.0 | | |
| 4 | −195.0 | 6.0 | 1.52 | 64.1 |
| 5 | −23.0 | 0.2 | | |
| 6 | 50.5 | 8.0 | 1.59 | 61.1 |
| 7 | −19.0 | 1.4 | 1.81 | 25.3 |
| 8 | −60.0 | 0.2 | | |
| 9 | 39.0 | 3.0 | 1.59 | 61.1 |
| 10 | 539.9 | 0.2 | | |
| 11 | 20.5 | 3.0 | 1.59 | 61.1 |
| 12 | 60.0 | | | |

Values of conditions:

f1 = −47.4 mm
f2 = 16.3 mm
D = 15.0 mm
(1) f1/f = −3.43
(2) D/f = 1.09
(3) f1/f2 = −2.91

Figure 6A:
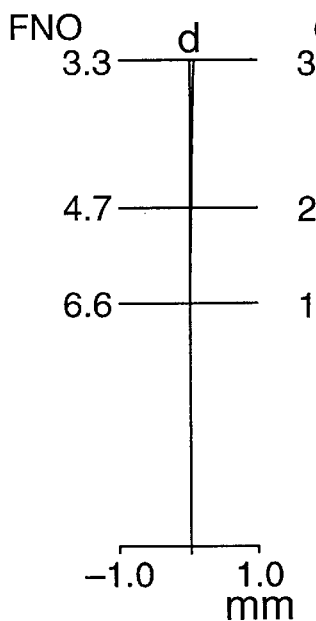
FIGS. 6A–6C are plots of spherical aberration, astigmatism, and distortion, respectively, for an eyepiece according to the third example embodiment.
Figure 6B:
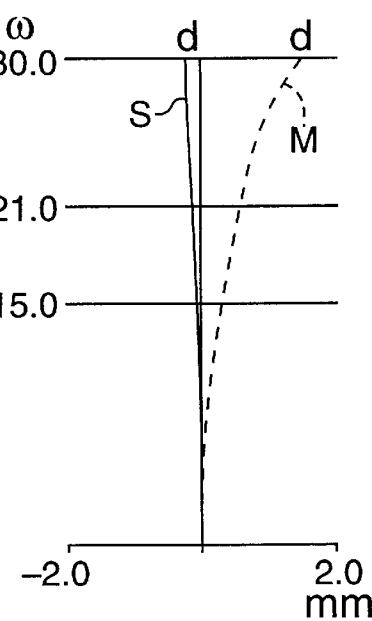
Figure 6C:
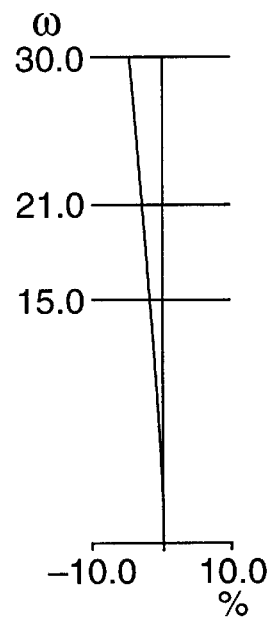

FIGS. 6A–6C are aberration plots for example embodiment 3, wherein FIG. 6A is of spherical aberration, FIG. 6B is of astigmatism, and FIG. 6C is of distortion. In each plot, the tracings pertain to light on the eye side. In FIG. 6A, FNO denotes the F number of the eyepiece, ω indicates the apparent field of view, and d indicates the d line (λ=587.6 nm). In FIG. 6B, S denotes the sagittal image surface and M denotes the meridional image surface.

As is clear from FIGS. 6A–6C, the various aberrations are favorably corrected in this example embodiment while maintaining a wide apparent field of view (apparent field of view of 60°), and while maintaining an eye relief that is 107 percent of the focal length of the eyepiece.

Therefore, according to the present invention, eyepieces are provided that have overall short lengths and compactness. In such eyepieces, optical aberrations are corrected over and up to the periphery of a wide apparent field of view. Moreover, each such eyepiece has an eye relief that is 100 percent or more of the focal length of the eyepiece.

While the invention has been described in connection with preferred embodiments, it will be understood that the invention is not limited to those embodiments. On the contrary, the invention is intended to encompass all alternatives, modifications, and equivalents a may be included within the spirit and scope of the invention as defined by the appended claims.

What is claimed is:

1. An eyepiece, comprising, in order from the objective side: first and second lens groups having negative and positive refractive power, respectively, together providing the eyepiece with a focal length f, the second lens group having an objective-side focal plane situated between the first lens group and the second lens group, the second lens group comprising, in order from the objective side, a first lens subgroup and a second lens subgroup, the first lens subgroup having positive refractive power and comprising a positive lens element and a positive cemented lens constructed of a biconvex lens element cemented to a negative meniscus lens element, and the second lens subgroup having positive refractive power and comprising a positive lens element, the eyepiece providing an eye relief that is at least as long as the focal length f and a wide apparent field of view, the eyepiece satisfying the condition:

$0.4 \leq D/f \leq 1.8$, wherein f is an overall focal length of the eyepiece and D is an axial spacing extending between the first and second lens groups in which is situated a focal plane of the eyepiece.

2. The eyepiece of claim 1, wherein the second lens subgroup comprises a positive lens element having a convex surface oriented toward the objective side.

3. The eyepiece of claim 2, wherein the second lens subgroup comprises two positive lens elements each having a convex surface oriented toward the objective side.

4. The eyepiece of claim 1, wherein the first lens group G1 comprises, in order from the objective side, a lens consisting of a negative lens element cemented to a positive lens element.

5. The eyepiece of claim 2, wherein the first lens group G1 comprises, in order from the objective side, a lens consisting of a negative lens element cemented to a positive lens element.

6. The eyepiece of claim 3, wherein the first lens group G1 comprises, in order from the objective side, a lens consisting of a negative lens element cemented to a positive lens element.

7. The eyepiece of claim 4, wherein the negative lens element is a biconcave lens element.

8. An eyepiece, comprising, in order from the objective side: a first lens group having a focal length f1 and a negative refractive power, and a second lens group having a focal length f2 and a positive refractive power, the eyepiece having an overall focal length f and a focal plane situated within an axial spacing D that extends between the first and second lens groups, the second lens group comprising, in order from the objective side, a first lens subgroup having positive refractive power and comprising a positive lens element and a positive cemented lens, and a second lens subgroup having positive refractive power and comprising a positive lens element, the objective satisfying the conditions:

$-3.6 \leq f1/f \leq -1.2$;

$0.4 \leq D/f \leq 1.8$; and $-3.4 \leq f1/f2 \leq -1.1$.

9. The eyepiece of claim 8, wherein the second lens subgroup comprises a positive lens element having a convex surface oriented toward the objective side.

10. The eyepiece of claim 8, wherein the second lens subgroup comprises first and second positive lens elements each having a convex surface oriented toward the objective side.

11. The eyepiece of claim 8, wherein the positive cemented lens in the first lens subgroup comprises, in order from the objective side, a bi-convex lens element cemented to a negative meniscus lens element.

12. The eyepiece of claim 9, wherein the positive cemented lens in the first lens subgroup comprises, in order from the objective side, a bi-convex lens element cemented to a negative meniscus lens element.

13. The eyepiece of claim 10, wherein the positive cemented lens in the first lens subgroup comprises, in order from the objective side, a bi-convex lens element cemented to a negative meniscus lens element.

14. The eyepiece of claim 8, further satisfying the condition:

$-3.5 \leq f1/f \leq -1.4.$

15. The eyepiece of claim 14, further satisfying the condition:

$-3.3 \leq f1/f \leq -1.5.$

16. The eyepiece of claim 8, further satisfying the condition:

$0.6 \leq D/f \leq 1.5.$

17. The eyepiece of claim 16, further satisfying the condition:

$0.7 \leq D/f \leq 1.1.$

18. The eyepiece of claim 8, further satisfying the condition:

$-3.2 \leq f1/f2 \leq -1.3.$

19. The eyepiece of claim 18, further satisfying the condition:

$-3.0 \leq f1/f2 \leq -1.5.$

20. The eyepiece of claim 8, wherein the first lens group consists of a negative compound lens including, in order from the objective side, a negative lens element cemented to a positive lens element.

21. The eyepiece of claim 1, wherein the first lens group has a focal length $f_1$, the eyepiece further satisfying the condition:

$-3.6 \leq f_1/f \leq -1.2.$

22. The eyepiece of claim 1, wherein the first lens group has a focal length $f_1$ and the second lens group has a focal length $f_2$, the eyepiece lens further satisfying the condition:

$-3.4 \leq f_1/f_2 \leq -1.1.$

23. The eyepiece of claim 1, wherein the biconvex lens element of the positive cemented lens in the first lens subgroup is situated toward the objective side of the negative lens element of the positive cemented lens.

* * * * *

UNITED STATES PATENT AND TRADEMARK OFFICE
CERTIFICATE OF CORRECTION

PATENT NO. : 5,812,324
DATED : September 22, 1998
INVENTOR(S) : Satoshi Fukumoto It is certified that error appears in the above-indentified patent and that said Letters Patent is hereby corrected as shown below:

Column 3, line 5, insert --objective-- after "the" and before "side".

Signed and Sealed this

Twenty-sixth Day of October, 1999

Attest:

Q. TODD DICKINSON

*Attesting Officer*          *Acting Commissioner of Patents and Trademarks*